United States Patent
Zhu et al.

(10) Patent No.: US 11,372,568 B2
(45) Date of Patent: Jun. 28, 2022

(54) SYSTEM AND METHOD FOR STORING AND ACCESSING BLOCKCHAIN DATA

(71) Applicant: ALIPAY (HANGZHOU) INFORMATION TECHNOLOGY CO., LTD., Zhejiang (CN)

(72) Inventors: Zhihui Zhu, Hangzhou (CN); Shan Yu, Hangzhou (CN)

(73) Assignee: ALIPAY (HANGZHOU) INFORMATION TECHNOLOGY CO., LTD., Hangzhou (CN)

(*) Notice: Subject to any disclaimer, the term of this patent is extended or adjusted under 35 U.S.C. 154(b) by 0 days.

(21) Appl. No.: 17/354,716

(22) Filed: Jun. 22, 2021

(65) Prior Publication Data

US 2021/0318803 A1 Oct. 14, 2021

(30) Foreign Application Priority Data

Jul. 24, 2020 (CN) .......................... 202010721997.5

(51) Int. Cl.
*G06F 3/06* (2006.01)
*H04L 9/06* (2006.01)

(52) U.S. Cl.
CPC ............ *G06F 3/064* (2013.01); *G06F 3/0604* (2013.01); *G06F 3/067* (2013.01); *G06F 3/0647* (2013.01); *H04L 9/06* (2013.01); *H04L 2209/38* (2013.01)

(58) Field of Classification Search
CPC ...... G06F 3/064; G06F 3/0604; G06F 3/0647; G06F 3/067; H04L 9/06; H04L 2209/38
See application file for complete search history.

(56) References Cited

U.S. PATENT DOCUMENTS

| | | | |
|---|---|---|---|
| 10,135,609 B2 | 11/2018 | Bibera et al. | |
| 10,176,212 B1* | 1/2019 | Prohofsky | G06F 3/0685 |
| 10,505,949 B2 | 12/2019 | Zhang | |
| 10,860,259 B1* | 12/2020 | Winarski | G06F 3/0649 |
| 2017/0132626 A1 | 5/2017 | Kennedy | |
| 2017/0264428 A1 | 9/2017 | Seger, II | |
| 2018/0253464 A1 | 9/2018 | Kohli et al. | |
| 2018/0323974 A1 | 11/2018 | Gao et al. | |

(Continued)

FOREIGN PATENT DOCUMENTS

| | | |
|---|---|---|
| CN | 107688440 A | 2/2018 |
| CN | 109274752 A | 1/2019 |
| WO | 2019/228569 A2 | 12/2019 |

OTHER PUBLICATIONS

First Search for Chinese Application No. 202010721997.5 dated Oct. 12, 2020.

(Continued)

*Primary Examiner* — Mark A Giardino, Jr.

(57) ABSTRACT

One or more embodiments of this specification provide, in a blockchain environment, a block data storage and access method and apparatus. The block data access method may include: determining a target storage space of a target block, where the target storage space is a local storage space and/or an external storage space, the local storage space is used for storing blocks of which access popularity is greater than a popularity threshold, and the external storage space is used for storing blocks that are not stored in the local storage space or full blocks; and accessing target data included in the target block in the target storage space.

20 Claims, 4 Drawing Sheets

(56) References Cited

U.S. PATENT DOCUMENTS

| | | |
|---|---|---|
| 2019/0005106 A1* | 1/2019 | Kalach ................. G06F 16/275 |
| 2019/0058582 A1 | 2/2019 | Pathak et al. |
| 2019/0103958 A1 | 4/2019 | Wu |
| 2019/0132350 A1 | 5/2019 | Smith et al. |
| 2019/0188700 A1 | 6/2019 | August et al. |
| 2019/0215324 A1 | 7/2019 | Qiu |
| 2019/0349199 A1 | 11/2019 | Wang et al. |
| 2019/0349733 A1 | 11/2019 | Nolan et al. |
| 2019/0358515 A1 | 11/2019 | Tran et al. |
| 2019/0370223 A1 | 12/2019 | Yang et al. |
| 2020/0167367 A1 | 5/2020 | Zhuo et al. |
| 2021/0081403 A1* | 3/2021 | Tian ..................... G06F 3/0658 |
| 2021/0201201 A1* | 7/2021 | Xia ..................... G06F 11/3433 |

OTHER PUBLICATIONS

Extended European Search Report for European Application No. 21 178 151.3 dated Nov. 11, 2021.

* cited by examiner

SYSTEM AND METHOD FOR STORING AND ACCESSING BLOCKCHAIN DATA

CROSS REFERENCE TO RELATED APPLICATIONS

This application claims priority to Chinese Patent Application No. 202010721997.5, filed on Jul. 24, 2020. The entire content of the above referenced application is incorporated herein by reference.

TECHNICAL FIELD

One or more embodiments of this specification relate to the field of blockchain technologies, and in particular, to a block data access method and apparatus, and a block data storage method and apparatus.

BACKGROUND

The blockchain technology (also referred to as a distributed ledger technology) is a decentralized distributed database technology and features decentralization, openness and transparency, tamper-proofing, and dependability, and is applicable to many application scenarios that have a high requirement for data reliability.

However, despite the advantages of decentralization and tamper-proofing of the blockchain technology, data storage using the blockchain technology also has disadvantages. For example, all blockchain nodes need to store a full copy of the distributed ledger. As a result, data only increases when the blockchain technology implements tamper-proofing of the data. With the increase in a quantity of blocks, a local storage space of a blockchain node cannot store newly generated blocks sooner or later. Therefore, the local storage space needs to be expanded continuously, resulting in continuously growing hardware costs and maintenance costs.

SUMMARY

In view of this, one or more embodiments of this specification provide a block data access method and apparatus, and a block data storage method and apparatus.

According to one aspect, an example method including: generating, by a blockchain node in a blockchain, a block comprising transaction data to be stored in the blockchain; storing, by the blockchain node, the block in a local storage space of the blockchain node; determining, by the blockchain node, an access frequency of the block; in response to the access frequency of the block being lower than a frequency threshold, moving, by the blockchain node, the block from the local storage space to an external storage space, wherein the external storage space comprises at least one of the following: a cloud storage server and a distributed storage device; and adding, by the blockchain node to a block index table, an entry representing a storage location of the block in the blockchain.

In some embodiments, the storing the block in a local storage space of the blockchain node comprises: in response to the storing of the block exceeding a capacity of the local storage space, determining one or more existing blocks in the local storage space with lower access frequencies; moving the one or more existing blocks to the external storage space; and storing the block in the local storage space.

In some embodiments, the method may further include copying and migrating the block in a batch at a scheduled time to the external storage space so that the external storage space stores a full set of blocks.

In some embodiments, the method may further include moving the block from the local storage space to the external storage space to provide storage space for a new block with a higher access frequency.

In some embodiments, the block index table indicates that the block is dispensable when the block is stored in both the local storage space and the external storage space, and the moving the block from the local storage space to the external storage space comprises: determining, based on the block index table, whether the block is dispensable; in response to the block being dispensable, directly deleting the block in the local storage space without writing the block to the external storage space.

In some embodiments, the method may further include after deleting the block in the local storage space, updating the entry in the block index table to indicate that the block is stored in the external storage space.

In some embodiments, the method may further include receiving a request for accessing the block; determining, based on the block index table, whether the storage location of the block; in response to the block being stored in both the local storage space and the external storage space, redirecting the request to the local storage space.

In some embodiments, the method may further include in response to the block being stored in the external storage space, redirecting the request to the external storage space to transfer the block to the local storage space.

In some embodiments, a data read and write speed of the local storage space is higher than a data read and write speed of the external storage space.

In some embodiments, the determining the access frequency of the block comprises: inputting a plurality of features of the block into a trained popularity analysis model for obtaining a predicted access frequency.

In some embodiments, the determining the access frequency of the block further comprises: collecting one or more access frequencies of the block while the block is stored in the internal storage space; and inputting the one or more access frequencies and the plurality of features of the block into the trained popularity analysis model to obtain the predicted access frequency.

According to another aspect, a system of a blockchain node in a blockchain is described. The system includes one or more processors and one or more non-transitory computer-readable memories coupled to the one or more processors and configured with instructions executable by the one or more processors to cause the system to perform operations comprising: generating, by the blockchain node in the blockchain, a block comprising transaction data to be stored in the blockchain; storing, by the blockchain node, the block in a local storage space of the blockchain node; determining, by the blockchain node, an access frequency of the block; in response to the access frequency of the block being lower than a frequency threshold, moving, by the blockchain node, the block from the local storage space to an external storage space, wherein the external storage space comprises at least one of the following: a cloud storage server and a distributed storage device; and adding, by the blockchain node to a block index table, an entry representing a storage location of the block in the blockchain.

According to yet another aspect, a non-transitory computer-readable storage medium of a blockchain node in a blockchain is described. The non-transitory computer-readable storage medium may be configured with instructions executable by one or more processors to cause the one or more processors to perform operations comprising: generating, by the blockchain node in the blockchain, a block comprising transaction data to be stored in the blockchain; storing, by the blockchain node, the block in a local storage space of the blockchain node; determining, by the blockchain node, an access frequency of the block; in response to the access frequency of the block being lower than a frequency threshold, moving, by the blockchain node, the block from the local storage space to an external storage space, wherein the external storage space comprises at least one of the following: a cloud storage server and a distributed storage device; and adding, by the blockchain node to a block index table, an entry representing a storage location of the block in the blockchain.

DETAILED DESCRIPTION

Exemplary embodiments are described in detail herein, and examples of the exemplary embodiments are shown in the accompanying drawings. When the following description involves the accompanying drawings, unless otherwise indicated, the same numerals in different accompanying drawings represent the same or similar elements. The implementations described in the following exemplary embodiments are not all the implementations consistent with one or more embodiments of this specification, but are instead only examples that are described in detail in the appended claims and are consistent with some aspects of the apparatuses and methods in one or more embodiments of this specification.

In some embodiments, the steps of corresponding methods are not necessarily performed according to a sequence shown and described in this specification. In some other embodiments, the methods may include more or fewer steps than those described in this specification. In addition, a single step described in this specification may be divided into a plurality of steps for description in other embodiments, and a plurality of steps described in this specification may be combined into a single step for description in other embodiments.

The embodiments described in this specification improve an existing data storage manner in the blockchain node, for the blockchain node to constantly store newly generated blocks without expanding the local storage space and read required block data quickly when a user needs to access the block data.

Figure 1:
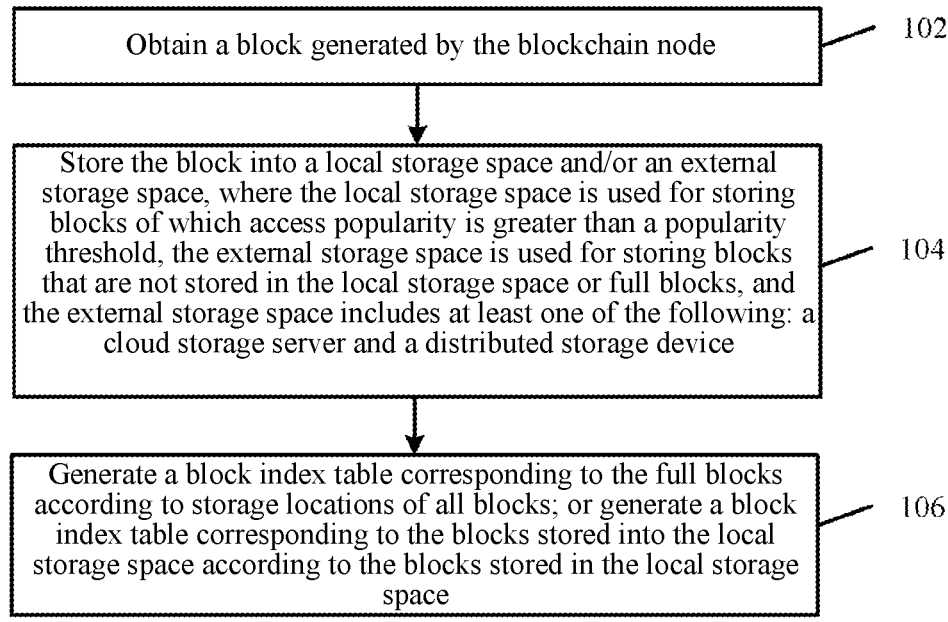
FIG. 1 is a flowchart of a block data storage method, according to an exemplary embodiment of this specification.

FIG. 1 is a block data storage method, according to an exemplary embodiment of this specification. The method is applicable to a blockchain node, and as shown in FIG. 1, the method may include the following steps.

Step 102: Obtaining a block generated by the blockchain node. In this specification, the blockchain node may be deployed in any type of electronic device, such as a mobile phone, a personal computer (PC), a tablet computer, a notebook computer, a personal digital assistant (PDA), a wearable device (such as smart glasses or a smartwatch), a server, or the like. This is not limited in this specification.

The blockchain node in this specification may be a node included in any type of blockchain network. For example, the blockchain network may be a public blockchain, a consortium blockchain, or a private blockchain, which is not limited in this specification.

Step 104: Storing the block into a local storage space and/or an external storage space, where the local storage space is used for storing blocks of which access popularity is greater than a popularity threshold, the external storage space is used for storing blocks that are not stored in the local storage space or full blocks, and the external storage space includes at least one of the following: a cloud storage server and a distributed storage device.

In the related art, all blocks generated by the blockchain node are generally stored in a local storage space. Since the local storage space is limited, the local storage space needs to be expanded continuously to prevent storage of blocks from being affected due to saturation of the local storage space, resulting in continuously growing hardware costs and maintenance costs.

In this specification, in addition to being stored in the local storage space, the blocks generated by the blockchain node are further stored in an external storage space. In this way, even if the quantity of stored blocks of the blockchain node only increases, it is only necessary to store the blocks into the external storage space without expanding the local storage space. In addition, in this specification, a block is stored according to access popularity of the block. The local storage space is used for storing blocks with relatively higher access popularity, and the external storage space may store blocks with relatively lower access popularity or full blocks. In this way, when the user needs to access block data, it is more probable that the required block data is directly obtained from the local storage space, thereby improving efficiency in accessing block data.

In this specification, a popularity threshold may be preset, and access popularity of a block is compared with the popularity threshold, to determine whether the block is stored into the local storage space or into the external storage space. The popularity threshold may be determined by a person skilled in the art according to an actual situation, and is not limited in this specification.

In this specification, a specific storage manner may be determined according to an actual situation, provided that a sum of the blocks stored into the local storage space and the blocks stored into the external storage space can cover the full blocks.

In an embodiment, the local storage space and the external storage space may each store a portion of the full blocks, and the blocks stored in the two storage spaces are not repeated. For example, blocks of which access popularity is higher than the popularity threshold are stored into the local storage space, and blocks of which access popularity is lower than the popularity threshold are stored into the external storage space. The blocks stored in this manner have no backup in the blockchain node to which the blocks belong. Therefore, the storage space is saved to the greatest extent, thereby avoiding a waste of the storage space.

In another embodiment, the local storage space may merely store a portion of the full blocks, and the external storage space stores the full blocks. For example, only the blocks of which access popularity is higher than the popularity threshold are stored into the local storage space, and the full blocks are stored into the external storage space. According to this manner, the full blocks are stored in the external storage space. Therefore, the blocks stored into the local storage space have backup blocks in the external storage space. The local storage space stores the blocks of which the access popularity is relatively higher, and the higher access popularity generally means that the blocks are more important. In other words, the external storage space stores backup blocks of the blocks with relatively higher access popularity, which is equivalent to backing up the relatively important blocks. As can be seen, the security of the relatively important blocks can be ensured according to the method of this embodiment. For example, the blocks that are initially only stored in the local storage space (due to high access frequencies) may be copied and migrated as a batch to the external storage space. The migration of the data may be scheduled at a time when the blockchain is serving the least requests. Migration data in batch also improves the efficiency of data transmission.

With the increase in the quantity of blocks, a total data volume of the blocks of which the access popularity is likely to be higher than the popularity threshold is greater than a capacity of the local storage space. In this case, only blocks with relatively higher access popularity among the blocks of which the access popularity is higher than the popularity threshold may be stored into the local storage space. For example, it is assumed that the capacity of the local storage space is 100 GB and the total data volume of the blocks of which the access popularity is higher than the popularity threshold is 150 GB. In this case, blocks that have relatively higher access popularity and of which a total data volume is less than or equal to 100 GB among the 150 GB of blocks may be determined, and the determined blocks are stored into the local storage space. The data volume of the determined blocks needs to be less than or equal to 100 GB because data is stored in the form of block and the data in the block cannot be stored separately. In some embodiments, if storing a newly generated block exceeds the capacity of the local storage space, the access popularity of the newly generated block may be compared against the existing blocks in the local storage space, and one or more blocks with lower access popularities may be removed to the external storage space before the newly generated block is stored locally.

During actual application, as many blocks as possible are generally stored into the local storage space. That is, in this example, the 100 GB of the local storage space is filled by the blocks with relatively higher access popularity as full as possible, to utilize the local storage space to the greatest extent. Thus, selecting the optimal set of blocks for storing in the local storage space can be formulated as a knapsack problem, in which the total size of the blocks to be selected should be smaller than the capacity of the local storage space, and the "value" of each block may be defined as the access popularity of the block. Solving this knapsack problem may include sorting the blocks may be first sorted by access popularity, and applying dynamical programming to determine the optimal set of blocks to be stored in the local storage space.

Step 106: Generating a block index table corresponding to the full blocks according to storage locations of all blocks; or generating, according to the blocks stored in the local storage space, a block index table corresponding to the blocks stored in the local storage space.

In this specification, a block index table may be generated based on storage locations of all blocks. For example, the block index table may record block indexes indicating whether the blocks are stored into the local storage space or the external storage space, for finding the storage locations of the blocks. A specific format and recorded content of the block index table may be determined according to an actual situation.

In some embodiments, if a block is stored in both the local and external storage spaces, the block index table may indicate that the locally stored block is dispensable. It means when the block needs to be moved (kicked out) from the local storage space to provide space for a newly created block with higher access frequency, the blockchain node may determine, based on the block index table, that the block is dispensable, and thus directly delete the block to reclaim the space, without writing the block to the external storage space. At the same time, the block index table is also updated to reflect that the block is now only stored in the external storage space.

In an embodiment, the block index table may correspond to the full blocks. For example, the block index table may be generated according to the storage locations of all the blocks. On this basis, when a user needs to access target data stored in a target block, it may be found out whether the target block is stored in the local storage space or stored in the external storage space according to the block index table. In this case, if the target block is stored in both the local storage space and the external storage space, the target block is accessed from the local storage space preferentially. The reason lies in that, during the actual application, if a block in the external storage space needs to be accessed, the block first needs to be read from the external storage space into the local storage space, and the block read into the local storage space is then accessed, which is relatively low in access efficiency.

In another embodiment, the block index table may only correspond to the blocks stored in the local storage space. The block index table may only record the blocks stored in the local storage space. On this basis, when a user needs to access target data stored in a target block, it may be determined whether the block index table records index information of the target block, and if the index information exists, it indicates that the target block is stored in the local storage space; otherwise, it indicates that the target block is stored in the external storage space. Correspondingly, if the local storage space and the external storage space only store one portion of the full blocks and the blocks stored in the two storage spaces are not repeated, the block index table may alternatively only correspond to the blocks stored in the external storage space. In this case, if the target block is found in the block index table, it indicates that the target block is stored in the external storage space; otherwise, it indicates that the target block is stored in the local storage space.

In this specification, the block index table may further record block data stored in the blocks. In this way, in a case that a block data access request for target data is received, a target block storing the target data is determined according to the block index table, and a storage location of the target block is then determined.

In this specification, the access popularity of a block may be correlated to the access frequency of the block.

In an embodiment, the access popularity of a block and the access frequency of the block within a preset duration are positively correlated. In this embodiment, the access popularity of the corresponding block may be directly represented by the access frequency. Correspondingly, the popularity threshold is represented by a frequency threshold. During actual application, an access frequency table may be generated based on access frequency of all the blocks, and the blocks are stored into the local storage space or the external storage space according to the access frequency table.

In another embodiment, the access popularity of the block may be obtained by a popularity analysis model through prediction according to access frequency of the corresponding block within a preset duration. The preset duration may be set in advance, access frequency and access popularity of stored blocks are obtained, and then the obtained access frequency is used as an input and the obtained access popularity is used as an output, to obtain the popularity analysis model through training. On this basis, in a case that a new block needs to be stored, access frequency of the corresponding block within the preset duration may be obtained through statistics collection first, and access popularity of the corresponding block is determined based on the access frequency obtained through statistics collection and the popularity analysis model.

In this specification, in addition to being correlated to the access frequency of the block, the access popularity may be alternatively correlated to other factors. For example, the access popularity may be alternatively correlated to the importance of data stored in the block, and when the data stored in the block is correlated to assets or identity information, the access popularity of the block is relatively higher. That is, the access popularity of the block and the importance of the data stored in the block are positively correlated. In another example, the access popularity may be alternatively correlated to a time period, when data stored in the block is more likely to be accessed in a current time period, the access popularity of the block in this time period is correspondingly increased. Certainly, this is merely an example, and a person skilled in the art may determine a factor correlated to the access popularity according to an actual situation, which is not limited in this specification.

In this specification, if a block stored in the external storage space needs to be accessed, the block needs to be transmitted to the local storage space first and then read from the local storage space. According to this manner, the accessed block may be cached in the local storage space for the user to read at any time.

In this specification, a data read and write speed of the local storage space is higher than a data read and write speed of the external storage space. Based on this, a block with relatively higher access popularity can be read and written quickly, thereby improving a speed at which the user accesses target data.

In this specification, there are a plurality of types of external storage space, and the external storage space may be a cloud storage server or a distributed storage device. Certainly, this is merely an example, and a network storage device of any other type may be alternatively used in addition to the cloud storage server and the distributed storage device. Similarly, in this specification, there may also be a plurality of types of local storage space. For example, the local storage space may be an internal memory, a solid state drive (SSD), or a hard disk drive (HDD). Types of device or hardware used by the local storage space and the external storage space may be determined by a person skilled in the art according to an actual situation. This is not limited in this specification.

As can be known from the foregoing technical solution, in this specification, the external storage space is introduced. Therefore, in a case that a total data volume occupied by all blocks that need to be stored is greater than the capacity of the local storage space, the blocks may be stored into the external storage space, thereby avoiding the technical problem in the related art that because data in the blockchain only increases, the local storage space needs to be expanded due to saturation of the local storage space, thereby reducing hardware costs and maintenance costs.

Further, in this specification, after blocks generated by a blockchain are obtained, blocks with relatively higher access popularity are stored into the local storage space, and blocks with relatively lower access popularity are stored into the external storage space. On this basis, when a user requests to access block data, the block data that needs to be accessed is more likely to be obtained from the local storage space, thereby improving efficiency of the user in accessing block data.

Further, in this specification, a popularity analysis model may be generated based on a plurality of stored blocks, and a newly generated block is stored based on the popularity analysis model. In some embodiments, the popularity analysis model is generally obtained through training based on a large quantity of blocks, so that access popularity predicted by the popularity analysis model is relatively accurate.

Corresponding to the foregoing block data storage method, this specification further provides a block data access method, to access block data stored by using the foregoing method.

Figure 2:
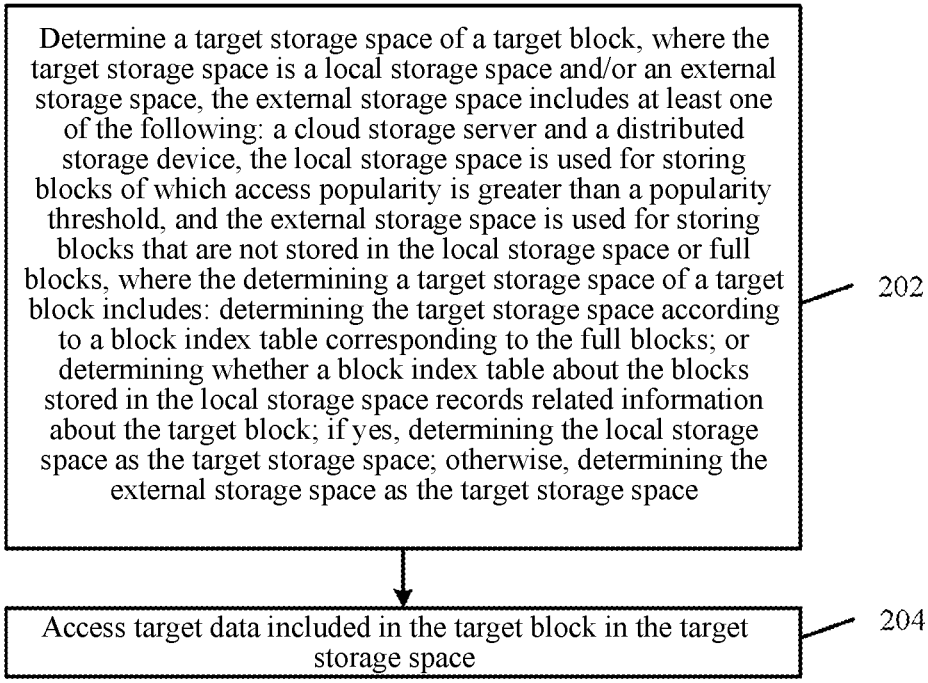
FIG. 2 is a flowchart of a block data access method, according to an exemplary embodiment of this specification.

FIG. 2 is a block data access method, according to an exemplary embodiment of this specification. The method is applicable to a blockchain node, and as shown in FIG. 2, the method may include the following steps.

Step 202: Determining a target storage space of a target block, where the target storage space is a local storage space and/or an external storage space, the external storage space includes at least one of the following: a cloud storage server and a distributed storage device, the local storage space is used for storing blocks of which access popularity is greater than a popularity threshold, and the external storage space is used for storing blocks that are not stored in the local storage space or full blocks; the determining a target storage space of a target block includes: determining the target storage space according to a block index table corresponding to the full blocks; or determining whether a block index table about the blocks stored in the local storage space records related information about the target block; if yes, determining the local storage space as the target storage space; otherwise, determining the external storage space as the target storage space.

As described above, the blockchain node may be deployed in any type of electronic device, the electronic device may be a common user terminal, such as a mobile phone, a PC, a tablet computer, a notebook computer, a palmtop computer, a wearable device, or a server.

As described above, the blockchain node in this specification may be a node included in any type of blockchain network. For example, the blockchain network may be a public blockchain, a consortium blockchain, or a private blockchain, which is not limited in this specification.

As described above, a popularity threshold may be preset, and access popularity of a block is compared with the popularity threshold, to determine whether the block is stored into the local storage space or into the external storage space. In one situation, the local storage space and the external storage space may each store one portion of the full blocks, and the blocks stored in the two storage spaces are not repeated. In another situation, the external storage space may store the full blocks.

As described above, in a case that a total data volume of the blocks of which the access popularity is higher than the popularity threshold is greater than a capacity of the local storage space, the local storage space is used for preferentially storing blocks with relatively higher access popularity among the blocks of which the access popularity is higher than the popularity threshold.

Step 204: Accessing target data included in the target block in the target storage space.

As described above, after the blocks are stored into the local storage space and/or the external storage space, a block index table may be generated based on storage locations of all the blocks. The block index table may only correspond to the blocks stored in the local storage space, or may correspond to the full blocks. In a case that the block index table corresponds to the full blocks, the blockchain node may determine, according to the block index table corresponding to the full blocks, the target storage space storing the target block. In a case that the block index table corresponds to the blocks stored in the local storage space, the blockchain node may determine whether the block index table about the blocks stored in the local storage space records related information about the target block; if yes, determine the local storage space as the target storage space; otherwise, determine the external storage space as the target storage space.

The block index table may further record block data stored in the blocks. In this way, in a case that a block data access request for target data is received, a target block storing the target data is determined according to the block index table, and a storage location of the target block is then determined.

The access popularity of a block may be correlated to access frequency of the block. In an embodiment, the access popularity of a block and the access frequency of the block within a preset duration are positively correlated. In another embodiment, the access popularity of the block may be obtained by a popularity analysis model through prediction according to access frequency of the corresponding block within a preset duration.

In addition to being correlated to the access frequency of the block, the access popularity may be alternatively correlated to other factors. For example, the access popularity may be correlated to importance of data stored in the block, and the access popularity may be alternatively correlated to a time period.

If a block stored in the external storage space needs to be accessed, the block needs to be transmitted to the local storage space first and then read from the local storage space.

As described above, a data read and write speed of the local storage space is higher than a data read and write speed of the external storage space. Based on this, a block with relatively higher access popularity can be read and written quickly, thereby improving a speed at which the user accesses target data.

In this specification, there are a plurality of types of external storage space. For example, the external storage space may be a cloud storage server, a distributed storage device, or the like. Similarly, in this specification, a plurality of types of local storage space may be used. For example, the local storage space may be an internal memory, an SSD, an HDD, or the like. Types of hardware or device used by the local storage space and the external storage space may be determined by a person skilled in the art according to an actual situation. This is not limited in this specification.

As can be known from the technical solutions, in this specification, blocks generated by the blockchain node are separately stored into the local storage space and/or the external storage space according to access popularity, where access popularity of blocks stored in the local storage space is higher than access popularity of blocks stored in the external storage space. According to this storage manner, the blocks with relatively higher access popularity can be accessed quickly, thereby improving efficiency in accessing block data.

Next, the technical solution of this specification is described by using an example in which the access popularity is represented by access frequency.

Figure 3:
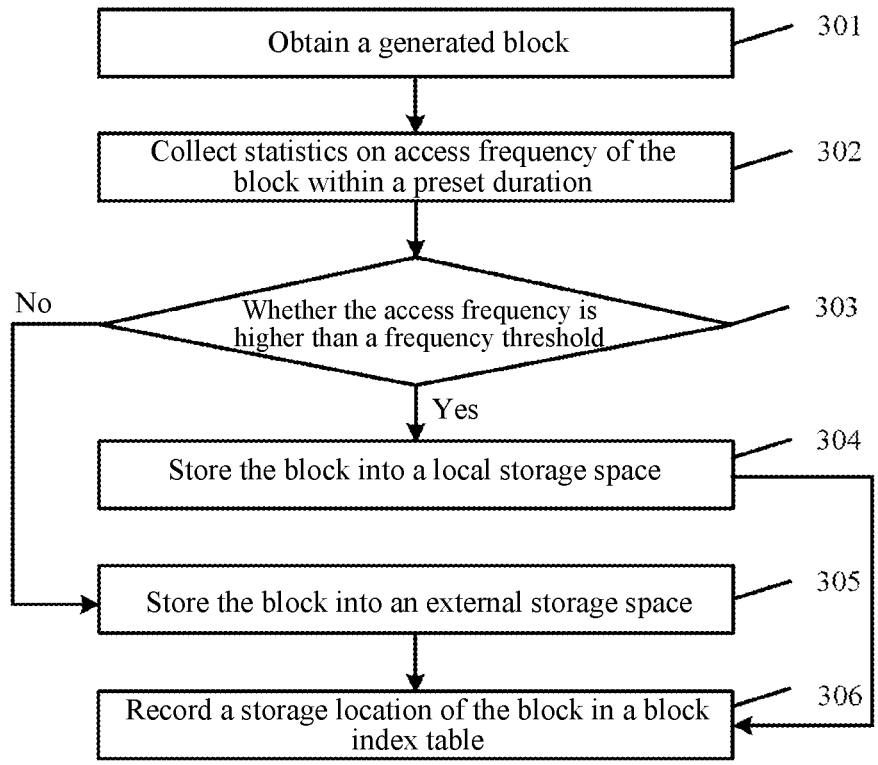
FIG. 3 is a flowchart of another block data storage method, according to an exemplary embodiment of this specification.

FIG. 3 is another block data storage method, according to an exemplary embodiment of this specification. The method is applicable to a blockchain node, and as shown in FIG. 3, the method may include the following steps.

Step 301: Obtaining a block generated by the blockchain node.

In this embodiment, the blockchain node may generate a corresponding block in a case of receiving a to-be-stored transaction. During actual application, after the block is generated, the block may be preferentially stored into a local storage space, to collect statistics on access frequency of the block according to a preset duration.

In a case that the local storage space has been saturated, the generated block may be first stored into an external storage space, to collect statistics on the access frequency of the block within the preset duration. During actual applications, the block may be directly stored into the external storage space in a case that the local storage space is not saturated, to collect statistics on the access frequency. This is not limited in this specification.

Step 302: Collecting statistics on access frequency of the block within a preset duration.

For ease of understanding, it is assumed that a block A and a block B are generated in step 301 in this embodiment, and the blocks are stored into the local storage space, to collect statistics on access frequency of the block A and the block B within the preset duration. It is assumed that, the preset duration is one minute, and within the preset duration, the block A is accessed 5 times and the block B is accessed once. It may be then obtained that the access frequency of the block A is 5 times per minute and the access frequency of the block B is once per minute.

Step 303: Determining whether the access frequency of the block within the preset duration is higher than a frequency threshold; if yes, jumping to step 304; otherwise, jumping to step 305.

In this embodiment, a frequency threshold may be preset, to serve as a basis for determining whether to store the block into the local storage space or the external storage space. For example, the frequency threshold may be 3 times per minute.

Continuing with the foregoing example, it may be determined that the access frequency of the block A is higher than the frequency threshold. Therefore, the block A may be stored into the local storage space. The access frequency of the block B is lower than the frequency threshold, and therefore the block B is stored into the external storage space.

Step 304: Storing the block into a local storage space.

Step 305: Storing the block into an external storage space.

If in step 301, blocks are preferentially stored into the local storage space, it is unnecessary to move blocks of which access frequency is higher than the frequency threshold; and blocks of which access frequency is lower than the frequency threshold need to be transferred into the external storage space.

If in step 301, blocks are preferentially stored into the external storage space, blocks of which access frequency is higher than the frequency threshold need to be transferred into the local storage space, and blocks of which access frequency is lower than the frequency threshold are not moved.

The foregoing storage manner is applicable to a situation that "the local storage space and the external storage space each store a portion of the full blocks," that is, any block is merely stored into the local storage space or the external storage space. During actual application, the full blocks may be alternatively stored in the external storage space. In this case, if in step 301, blocks are preferentially stored into the local storage space, blocks of which access frequency is higher than the frequency threshold need to be copied to the external storage space, and blocks of which access frequency is lower than the frequency threshold are transferred into the external storage space. If in step 301, blocks are preferentially stored into the external storage space, blocks of which access frequency is higher than the frequency threshold need to copied to the local storage space, and no operation is performed on blocks of which access frequency is lower than the frequency threshold.

Step 306: Recording a storage location of the block in a block index table.

In this embodiment, after the blocks are stored into corresponding storage spaces, a corresponding block index table may be generated. The block index table records storage locations of the blocks, for finding a storage location of a block that needs to be accessed in a case that an access request is received.

Continuing with the foregoing example, a block index table shown in Table 1 may be generated for the block A and the block B.

TABLE 1

| Block | Storage location |
|---|---|
| Block A | Local storage space |
| Block B | External storage space |

As shown in Table 1, the block index table records that a storage location of the block A is the local storage space, and a storage location of the block B is the external storage space.

In this embodiment, the blocks stored into the local storage space and the blocks stored into the external storage space are all recorded in the block index table. However, during actual application, the block index table may alternatively record only the blocks stored in the local storage space or the blocks stored in the external storage space.

As can be known from the foregoing technical solution, after a blockchain node generates a block, the blockchain node may collect statistics on access frequency of the block within a preset duration, and compare the access frequency with a preset frequency threshold. In this way, blocks of which access frequency is higher than the frequency threshold are stored into the local storage space, and blocks of which access frequency is lower than the frequency threshold are stored into the external storage space. On one hand, a storage process of the blocks may not be affected even if the local storage space is saturated, thereby avoiding the problem in the related art that because data in the blockchain only increases, the local storage space needs to be expanded continuously due to saturation of the local storage space. On the other hand, in this specification, blocks with relatively high access frequency are stored into the local storage space, so that the blocks with relatively high access frequency can be accessed quickly, thereby improving efficiency in accessing blocks.

After the blocks generated by the blockchain node are stored based on the previous embodiment, the storage locations of the blocks may be further adjusted according to changes in the access frequency of the blocks. Next, based on the previous embodiment, how to adjust a storage location of a block based on changes in the access frequency of the block is described.

Figure 4:
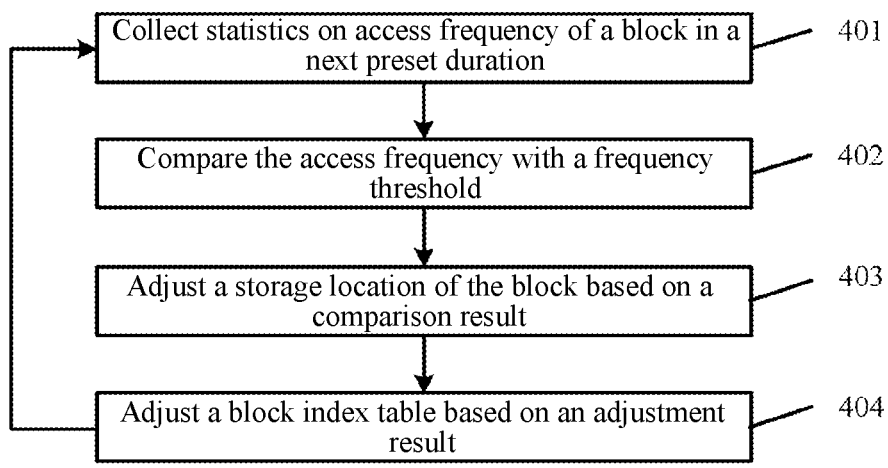
FIG. 4 is a flowchart of a method for adjusting a block storage location, according to an exemplary embodiment of this specification.

FIG. 4 is a method for adjusting a block storage location, according to an exemplary embodiment of this specification. As shown in FIG. 4, the method may include the following steps:

Step 401: Collecting statistics on access frequency of a block within a next preset duration.

The next preset duration in this step refers to a preset duration after the first preset duration for statistical collection in the previous embodiment.

In this embodiment, after the block is stored according to the manner of the previous embodiment, a storage location of the block may be further adjusted based on changes in the access frequency of the block.

Continuing with the example of the previous embodiment, it is assumed that the access frequency of the block A obtained through statistics collection in the next preset duration is 2 times per minute, and the access frequency of the block B is also 2 times per minute, Step 402: Comparing the access frequency of the block obtained through statistics collection with a frequency threshold.

In this embodiment, the obtained access frequency of the block may still be compared with the preset frequency threshold, to adjust the storage location of the block according to a comparison result.

Step 403: Adjusting a storage location of the block based on a comparison result.

Continuing with the foregoing example, the access frequency of 2 times per minute of the block A may be compared with the frequency threshold of 3 times per minute. In this example, it may be determined that the access frequency of the block A in the next preset duration has been lower than the frequency threshold. Therefore, the block A needs to be transferred from the local storage space to the external storage space. For the block B, it may be determined that the access frequency of the block B in the next preset duration is still lower than the frequency threshold. Therefore, the storage location of the block B is not adjusted and the block B is still stored in the external storage space.

If the external storage space stores the full blocks, it only requires to delete the block A stored in the local storage space, and no operation needs to be performed on the block B.

Step 404: Updating a block index table based on an adjustment result and jumping to step 401.

In this embodiment, after the storage location of the block is adjusted, the block index table needs to be updated correspondingly, to avoid that the block cannot be found since the block index table is not timely updated.

Continuing with the foregoing example, the updated block index table may be shown in Table 2.

TABLE 2

| Block | Storage location |
|---|---|
| Block A | External storage space |
| Block B | External storage space |

Processes of adjusting the block storage location and updating the block index table are constantly performed. Therefore, after the block index table is updated, step 401 may be performed, to perform a next adjustment of the block location and next update of the index table.

After the generated block is stored based on the previous embodiment, this embodiment may continue to collect statistics on the access frequency of the stored block and adjust the storage location of the stored block according to a result of comparison between the access frequency obtained through statistics collection and the frequency threshold, so that blocks with relatively high access frequency are always stored in the local storage space with a higher read and write speed, thereby ensuring efficiency of the user in accessing blocks.

In addition, in this embodiment, after the storage location of the stored block is adjusted, the block index table may be updated based on the storage location after the adjustment. In this way, when the user needs to access a block, the user may find the block that needs to be accessed according to a latest block index table, thereby avoiding the problem that the block to be accessed cannot be found since the block index table is not timely updated.

Based on the foregoing embodiment, this specification further provides a block data access method.

Figure 5:
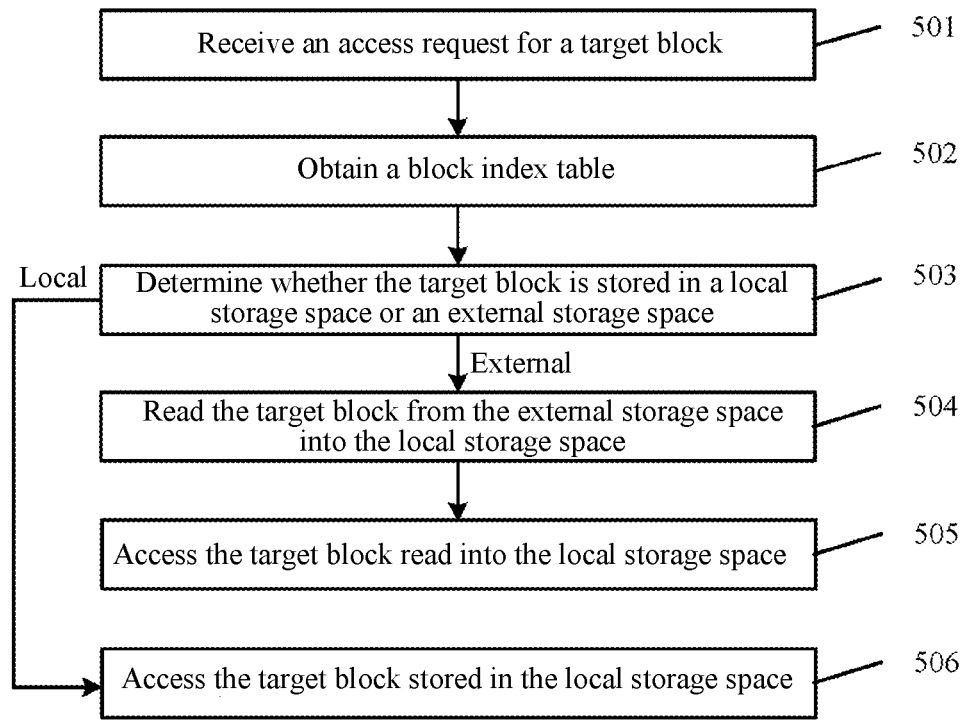
FIG. 5 is a flowchart of another block data access method, according to an exemplary embodiment of this specification.

FIG. 5 is another block data access method, according to an exemplary embodiment of this specification. As shown in FIG. 5, the method may include the following steps:

Step 501: Receiving an access request for a target block.

During actual application, a blockchain node may receive an access request for data stored in a block rather than an access request directly for a block. Therefore, in a case that an access request for any data such as target data is received, a target block storing the target data may be determined first, a storage space storing the target block is further determined, and the target data is then obtained by accessing the target block stored in the determined storage space.

Step 502: Obtaining a block index table maintained by a blockchain node.

In this embodiment, to determine the target block corresponding to the target data, in a process of generating blocks, data included in the blocks may be further recorded in the block index table. According to this manner, in a case that an access request for any data is received, a block including the any data may be determined, to further determine a storage space storing the block.

Step 503: Determining whether the target block is stored in a local storage space or an external storage space based on the block index table.

Using Table 1 in the foregoing embodiment as an example, if the target block determined in step 501 is the block A, it may be determined, based on the block index table, that the block A is stored in the local storage space; and if the target block determined in step 501 is the block B, it may be determined, based on the block index table, that the block B is stored in the external storage space.

Step 504: Reading the target block from the external storage space into the local storage space in a case of determining that the target block is stored in the external storage space.

Continuing with the foregoing example, in a case that the target block is the block B, the block B stored in the external storage space may be first read into the local storage space. For example, if the external storage space may be a cloud storage server, a request for obtaining the block B may be transmitted/redirected to the cloud storage server, to transfer the block B from the cloud storage server to the local storage space. Based on this, the block B transferred to the local storage space may be directly accessed. In some embodiments, if a block is stored in both the local and the external storage spaces, the access request may be redirected to the local storage space to directly read the block stored therein.

Step 505: Accessing the target block read into the local storage space.

Step 506: Accessing the target block stored in the local storage space in a case of determining that the target block is stored in the local storage space.

Continuing with the foregoing example, in a case that the target block is the block A, the block A stored in the local storage space may be directly accessed.

In a case that an access request for a target block is received, in this specification, a storage space storing the target block may be determined according to the block index table maintained by the blockchain node. In a case of determining that the target block is stored in the local storage space, the target block stored in the local storage space may be directly accessed; and in a case of determining that the target block is stored in the external storage space, the target block may be first read from the external storage space into the local storage space, and then the target block read into the local storage space is accessed. As can be seen, according to the technical solution of this specification, the storage location of the block can be accurately determined, thereby improving efficiency in accessing block data.

Figure 6:
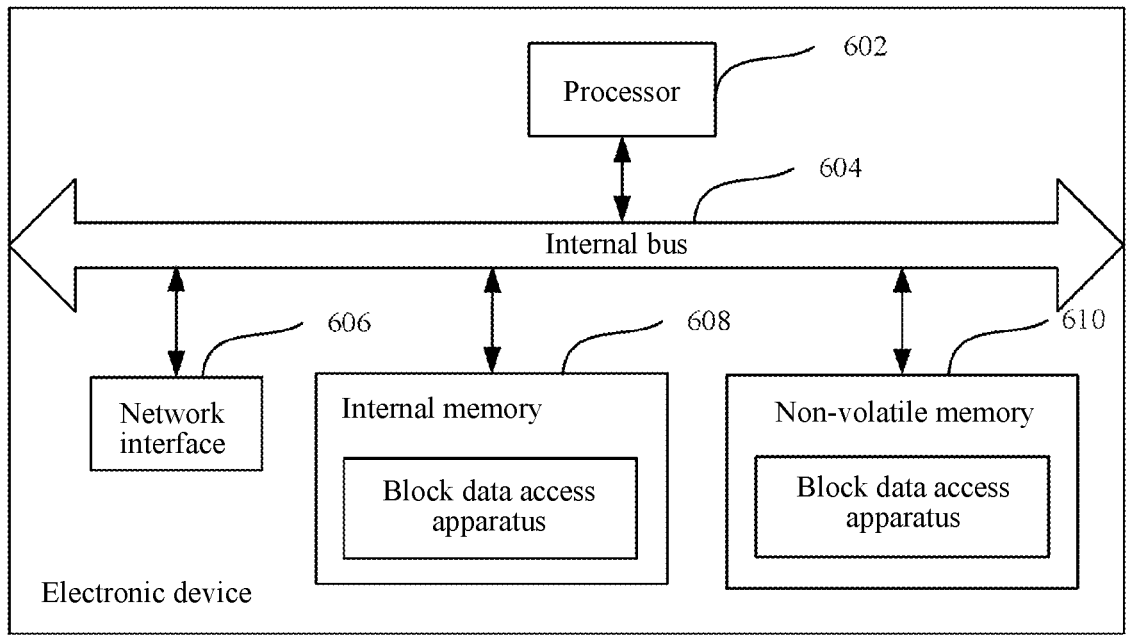
FIG. 6 is a schematic structural diagram of an electronic device, according to an exemplary embodiment of this specification.

FIG. 6 is a schematic structural diagram of an electronic device, according to an exemplary embodiment. Referring to FIG. 6, at a hardware level, the device includes a processor 602, an internal bus 604, a network interface 606, an internal memory 608, and a non-volatile memory 610, and certainly may further include hardware required for other services. The processor 602 reads a corresponding computer program from the non-volatile memory 610 into the internal memory 608 and then executes the computer program, to form a block data access apparatus at a logic level. Certainly, in addition to a software implementation, one or more embodiments of this specification do not exclude other implementations, for example, logic devices or a software-hardware combination. That is, execution bodies of the following processing procedures are not limited to logic units and may alternatively be hardware or logic devices.

Figure 7:
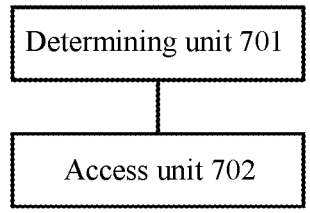
FIG. 7 is a block diagram of a block data access apparatus, according to an exemplary embodiment of this specification.

Referring to FIG. 7, in a software implementation, the block data access apparatus may include: a determining unit 701, configured to determine a target storage space of a target block, where the target storage space is a local storage space and/or an external storage space, the external storage space includes at least one of the following: a cloud storage server and a distributed storage device, the local storage space is used for storing blocks of which access popularity is greater than a popularity threshold, and the external storage space is used for storing blocks that are not stored in the local storage space or full blocks, where the determining unit 701 is further configured to: determine the target storage space according to a block index table corresponding to the full blocks; or determine whether a block index table about the blocks stored in the local storage space records related information about the target block; if yes, determine the local storage space as the target storage space; otherwise, determine the external storage space as the target storage space; and an accessing unit 702, configured to access target data included in the target block in the target storage space.

In some embodiments, in a case that a total data volume of the blocks of which the access popularity is higher than the popularity threshold is greater than a capacity of the local storage space, the local storage space is used for preferentially storing blocks with relatively higher access popularity among the blocks of which the access popularity is higher than the popularity threshold.

In some embodiments, the access popularity and access frequency of a corresponding block within a preset duration are positively correlated; or the access popularity is obtained by a popularity analysis model through prediction according to access frequency of a corresponding block within a preset duration.

In some embodiments, a data read and write speed of the local storage space is higher than a data read and write speed of the external storage space.

Figure 8:
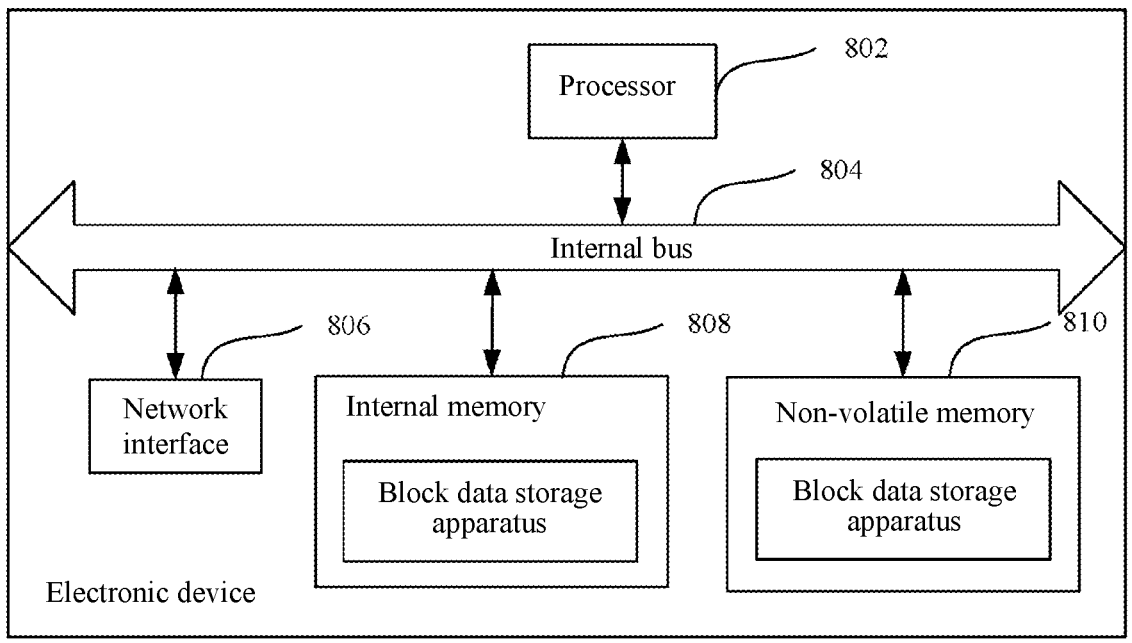
FIG. 8 is a schematic structural diagram of another electronic device, according to an exemplary embodiment of this specification.

FIG. 8 is a schematic structural diagram of an electronic device, according to an exemplary embodiment. Referring to FIG. 8, at the hardware level, the device includes a processor 802, an internal bus 804, a network interface 806, an internal memory 808, and a non-volatile memory 810, and certainly may further include hardware required for other services. The processor 802 reads a corresponding computer program from the non-volatile memory 810 into the internal memory 808 and then executes the computer program, to form a block data storage apparatus at a logic level. Certainly, in addition to a software implementation, one or more embodiments of this specification do not exclude other implementations, for example, logic devices or a software-hardware combination. That is, execution bodies of the following processing procedures are not limited to logic units and may alternatively be hardware or logic devices.

Figure 9:
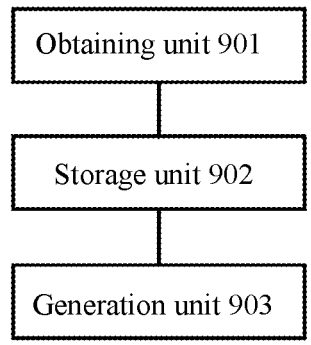
FIG. 9 is a block diagram of a block data storage apparatus, according to an exemplary embodiment of this specification.

Referring to FIG. 9, in a software implementation, the block data storage apparatus may include: an obtaining unit 901, configured to obtain a block generated by the blockchain node; a storage unit 902, configured to store the block into a local storage space and/or an external storage space, where the local storage space is used for storing blocks of which access popularity is greater than a popularity threshold, the external storage space is used for storing blocks that are not stored in the local storage space or full blocks, and the external storage space includes at least one of the following: a cloud storage server and a distributed storage device; and a generation unit 903, configured to generate a block index table corresponding to the full blocks according to storage locations of all blocks; or generate a block index table corresponding to the blocks stored into the local storage space according to the blocks stored in the local storage space.

In some embodiments, the storage unit 902 is further configured to: in a case that a total data volume of the blocks of which the access popularity is higher than the popularity threshold is greater than a capacity of the local storage space, store blocks with relatively higher access popularity among the blocks of which the access popularity is higher than the popularity threshold into the local storage space.

In some embodiments, the access popularity and access frequency of a corresponding block within a preset duration are positively correlated; or the access popularity is obtained by a popularity analysis model through prediction according to access frequency of a corresponding block within a preset duration.

In some embodiments, a data read and write speed of the local storage space is higher than a data read and write speed of the external storage space.

The system, the apparatus, the module, or the unit described in the foregoing embodiments may be specifically implemented by a computer chip or an entity, or implemented by a product having a certain function. A typical implementation device is a computer. A specific form of the computer may be a personal computer, a laptop computer, a cellular phone, a camera phone, a smartphone, a personal digital assistant, a media player, a navigation device, an email transceiver device, a game console, a tablet computer, a wearable device, or a combination of any devices of these devices.

In a typical configuration, the computer includes one or more processors (such as CPUs), an input/output interface, a network interface, and an internal memory.

The internal memory may include, among computer readable media, a non-persistent memory such as a random access memory (RAM) and/or a non-volatile memory such as a read-only memory (ROM) or a flash memory (flash RAM). The internal memory is an example of the computer-readable medium.

The computer-readable medium includes a non-volatile medium and a volatile medium, a removable medium and a non-removable medium, which may implement storage of information by using any method or technology. The information may be a computer-readable instruction, a data structure, a program module, or other data. Examples of a storage medium of a computer include, but are not limited to, a phase-change memory (PRAM), a static random-access memory (SRAM), a dynamic random-access memory (DRAM), a RAM of another type, a random access memory (ROM), an electrically erasable programmable read-only memory (EEPROM), a flash memory or another memory technology, a compact disc read-only memory (CD-ROM), a digital versatile disc (DVD) or another optical storage device, a cassette tape, a magnetic disk storage, a quantum memory, a graphene-based storage medium or another magnetic storage device, or any other non-transmission medium, which may be configured to store information accessible by a computing device. According to limitations of this specification, the computer-readable medium does not include transitory computer-readable media, such as a modulated data signal and a modulated carrier.

The terms "include," "comprise," or any variants thereof are intended to cover a non-exclusive inclusion. Therefore, a process, method, article, or device that includes a series of elements not only includes such elements, but also includes other elements not specified expressly, or may include inherent elements of the process, method, article, or device. Unless otherwise specified, an element limited by "include a/an . . . " does not exclude other same elements existing in the process, the method, the article, or the device that includes the element.

Embodiments of this specification are described above. Other embodiments fall within the scope of the appended claims. In some embodiments, the actions or steps recorded in the claims may be performed in sequences different from those in the embodiments and an expected result may still be achieved. In addition, the processes depicted in the accompanying drawings is not necessarily performed in the specific order or successively to achieve an expected result. In some implementations, multitasking and parallel processing may be feasible or beneficial.

The terms used in one or more embodiments of this specification are merely used to describe the embodiments but are not intended to limit one or more embodiments of this specification. The "a" and "the" in a singular form used in one or more embodiments of this specification and the appended claims are also intended to include a plural form, unless other meanings are clearly indicated in the context. The term "and/or" used herein indicates and includes any or all possible combinations of one or more associated listed items.

Although the terms "first," "second," "third," and the like may be used to describe various information in one or more embodiments of this specification, such information should not be limited to these terms. These terms are merely used to distinguish between information of the same type. For example, without departing from the scope of one or more embodiments of this specification, first information may also be referred to as second information. Similarly, second information may also be referred to as first information. Depending on the context, for example, the word "if" used herein may be interpreted as "while," or "when," or "in response to determination."

The foregoing descriptions are merely preferred embodiments of one or more embodiments of this specification, but are not intended to limit the one or more embodiments of this specification. Any modification, equivalent replacement, or improvement made within the spirit and principle of one or more embodiments of this specification shall fall within the protection scope of the one or more embodiments of this specification.

What is claimed is:

1. A blockchain data storage method, comprising:
   generating, by a blockchain node in a blockchain, a block comprising transaction data to be stored in the blockchain;
   storing, by the blockchain node, the block in a local storage space of the blockchain node;
   determining, by the blockchain node, an access frequency of the block;
   in response to the access frequency of the block being lower than a frequency threshold, moving, by the blockchain node, the block from the local storage space to an external storage space, wherein the external storage space comprises at least one of the following: a cloud storage server and a distributed storage device;
   in response to the access frequency of the block being greater than the frequency threshold, copying, by the blockchain node, the block to the external storage space of the blockchain node so that the block is stored in both the local storage space and the external storage space; and
   adding, by the blockchain node in a block index table, a block index entry representing a storage location of the block in the blockchain, wherein the adding comprises:
   when the block is stored in both the local storage space and the external storage space of the blockchain node, generating the block index entry representing that (1) the block is located in the local storage space of the blockchain node and (2) the block is removable from the local storage space without writing the block to the external storage space.

2. The method of claim 1, wherein the storing the block in a local storage space of the blockchain node comprises:
   in response to the storing of the block exceeding a capacity of the local storage space, determining one or more existing blocks in the local storage space with lower access frequencies;
   moving the one or more existing blocks to the external storage space; and
   storing the block in the local storage space.

3. The method of claim 1, wherein the copying comprises:
   copying and migrating the block in a batch at a scheduled time to the external storage space so that the external storage space stores a full set of blocks.

4. The method of claim 1, wherein the moving comprises:
   moving the block from the local storage space to the external storage space to provide storage space for a new block with a higher access frequency.

5. The method of claim 4, wherein the block index table indicates that the block is dispensable when the block is stored in both the local storage space and the external storage space, and
   the moving the block from the local storage space to the external storage space comprises:
   determining, based on the block index table, whether the block is dispensable; and
   in response to the block being dispensable, directly deleting the block in the local storage space without writing the block to the external storage space.

6. The method of claim 5, further comprising:
   after deleting the block in the local storage space, updating the block index entry in the block index table to indicate that the block is stored in the external storage space.

7. The method of claim 1, further comprising:
   receiving a request for accessing the block;
   determining, based on the block index table, whether the storage location of the block; and
   in response to the block being stored in both the local storage space and the external storage space, redirecting the request to the local storage space.

8. The method of claim 7, further comprising:
   in response to the block being stored in the external storage space, redirecting the request to the external storage space to transfer the block to the local storage space.

9. The method according to claim 1, wherein a data read and write speed of the local storage space is higher than a data read and write speed of the external storage space.

10. The method according to claim 1, wherein the determining the access frequency of the block comprises:
    inputting a plurality of features of the block into a trained popularity analysis model for obtaining a predicted access frequency.

11. The method according to claim 10, wherein the determining the access frequency of the block further comprises:
    collecting one or more access frequencies of the block while the block is stored in the local storage space; and
    inputting the one or more access frequencies and the plurality of features of the block into the trained popularity analysis model to obtain the predicted access frequency.

12. A system of a blockchain node in a blockchain, comprising one or more processors and one or more non-transitory computer-readable memories coupled to the one or more processors and configured with instructions executable by the one or more processors to cause the system to perform operations comprising:

generating, by the blockchain node in the blockchain, a block comprising transaction data to be stored in the blockchain;

storing, by the blockchain node, the block in a local storage space of the blockchain node;

determining, by the blockchain node, an access frequency of the block;

in response to the access frequency of the block being lower than a frequency threshold, moving, by the blockchain node, the block from the local storage space to an external storage space, wherein the external storage space comprises at least one of the following: a cloud storage server and a distributed storage device;

in response to the access frequency of the block being greater than the frequency threshold, copying, by the blockchain node, the block to the external storage space of the blockchain node so that the block is stored in both the local storage space and the external storage space; and adding, by the blockchain node in a block index table, a block index entry representing a storage location of the block in the blockchain, wherein the adding comprises:

when the block is stored in both the local storage space and the external storage space of the blockchain node, generating the block index entry representing that (1) the block is located in the local storage space of the blockchain node and (2) the block is removable from the local storage space without writing the block to the external storage space.

13. The system of claim 12, wherein the storing the block in a local storage space of the blockchain node comprises:

in response to the storing of the block exceeding a capacity of the local storage space, determining one or more existing blocks in the local storage space with lower access frequencies;

moving the one or more existing blocks to the external storage space; and storing the block in the local storage space.

14. The system of claim 12, wherein the moving comprise:

moving the block from the local storage space to the external storage space to provide storage space for a new block with a higher access frequency.

15. The system of claim 14, wherein the block index table indicates that the block is dispensable when the block is stored in both the local storage space and the external storage space, and the moving the block from the local storage space to the external storage space comprises:

determining, based on the block index table, whether the block is dispensable; and in response to the block being dispensable, directly deleting the block in the local storage space without writing the block to the external storage space.

16. The system of claim 12, wherein the operations further comprise:

receiving a request for accessing the block;

determining, based on the block index table, whether the storage location of the block; and in response to the block being stored in both the local storage space and the external storage space, redirecting the request to the local storage space.

17. A non-transitory computer-readable storage medium of a blockchain node in a blockchain, configured with instructions executable by one or more processors to cause the one or more processors to perform operations comprising:

generating, by the blockchain node in the blockchain, a block comprising transaction data to be stored in the blockchain;

storing, by the blockchain node, the block in a local storage space of the blockchain node;

determining, by the blockchain node, an access frequency of the block;

in response to the access frequency of the block being lower than a frequency threshold, moving, by the blockchain node, the block from the local storage space to an external storage space, wherein the external storage space comprises at least one of the following: a cloud storage server and a distributed storage device;

in response to the access frequency of the block being greater than the frequency threshold, copying, by the blockchain node, the block to the external storage space of the blockchain node so that the block is stored in both the local storage space and the external storage space; and adding, by the blockchain node in a block index table, a block index entry representing a storage location of the block in the blockchain, wherein the adding comprises:

when the block is stored in both the local storage space and the external storage space of the blockchain node, generating the block index entry representing that (1) the block is located in the local storage space of the blockchain node and (2) the block is removable from the local storage space without writing the block to the external storage space.

18. The non-transitory computer-readable storage medium of claim 17, wherein the storing the block in a local storage space of the blockchain node comprises:

in response to the storing of the block exceeding a capacity of the local storage space, determining one or more existing blocks in the local storage space with lower access frequencies;

moving the one or more existing blocks to the external storage space; and storing the block in the local storage space.

19. The non-transitory computer-readable storage medium of claim 17, wherein the moving comprises:

moving the block from the local storage space to the external storage space to provide storage space for a new block with a higher access frequency.

20. The non-transitory computer-readable storage medium of claim 17, wherein the block index table indicates that the block is dispensable when the block is stored in both the local storage space and the external storage space, and the moving the block from the local storage space to the external storage space comprises:

determining, based on the block index table, whether the block is dispensable; and in response to the block being dispensable, directly deleting the block in the local storage space without writing the block to the external storage space.

* * * * *